(12) United States Patent
Simon

(10) Patent No.: US 6,489,897 B2
(45) Date of Patent: Dec. 3, 2002

(54) VEHICLE LOCATION SYSTEM

(75) Inventor: Michael P. Simon, Fallbrook, CA (US)

(73) Assignee: Payment Protection Services, Inc., Temecula, CA (US)

( * ) Notice: Subject to any disclaimer, the term of this patent is extended or adjusted under 35 U.S.C. 154(b) by 0 days.

(21) Appl. No.: 09/954,183

(22) Filed: Sep. 18, 2001

(65) Prior Publication Data

US 2002/0039071 A1 Apr. 4, 2002

Related U.S. Application Data

(60) Provisional application No. 60/236,392, filed on Sep. 29, 2000, and provisional application No. 60/288,796, filed on May 7, 2001.

(51) Int. Cl.$^7$ ................................................. G08B 5/22
(52) U.S. Cl. ........................... 340/825.36; 340/825.49; 340/992; 340/425.5; 340/988; 342/357.07; 701/30; 701/29; 701/213; 705/22; 705/38; 705/40
(58) Field of Search ..................... 340/825.36, 825.49, 340/992, 425.5, 988; 342/357.07; 701/30, 29, 213; 705/22, 38, 40

(56) References Cited

U.S. PATENT DOCUMENTS

| | | | |
|---|---|---|---|
| 5,490,200 A | | 2/1996 | Snyder et al. |
| 5,510,780 A | | 4/1996 | Norris et al. |
| 5,657,008 A | * | 8/1997 | Bantli ......................... 340/933 |
| 5,898,391 A | * | 4/1999 | Jefferies et al. ............. 340/988 |
| 6,025,774 A | | 2/2000 | Forbes |
| 6,163,251 A | * | 12/2000 | Escareno et al. ........... 340/426 |
| 6,195,648 B1 | * | 2/2001 | Simon et al. ................. 705/40 |

* cited by examiner

Primary Examiner—Daniel J. Wu
Assistant Examiner—Tai T. Nguyen
(74) Attorney, Agent, or Firm—Burns, Doane, Swecker & Mathis, L.L.P.

(57) ABSTRACT

A vehicle location system which operates to provide a location of a vehicle. Specifically, if a payment due date associated with the vehicle has passed and a payment has not been received for the vehicle, the vehicle location system operates to provide the vehicle's location to a service agency. The service agency can then locate and repossess the vehicle. Additionally, the vehicle location system can be activated if it is detected that the vehicle is being tampered with. The location of the vehicle can be determined using global positioning satellites or by triangulation using base stations in mobile radio systems.

23 Claims, 3 Drawing Sheets

VEHICLE LOCATION SYSTEM

The present application claims priority under 35 U.S.C. §119 to U.S. Provisional Application No. 60/236,392 "Automatic Code System, GETIT, Tamper Proof" to Michael Simon filed Sep. 29, 2000 and to U.S. Provisional Application No. 60/288,796 "Vehicle Location System" to Michael Simon filed on May 7, 2001, the disclosure of both of these are herein expressly incorporated by reference.

BACKGROUND OF THE INVENTION

The present invention is related to systems and methods for location vehicles. More particulary, the present invention is related to systems and methods for location of vehicles which have been disabled in response to the failure of a user to enter a code that corresponds with a stored code in the vehicle or in response to a detected tampering with the system.

Typically, monthly payments to utility companies are made with very high reliability. This is partly due to the threat of service cut-off. For example, failure to pay a telephone bill will result in loss of telephone services. Thus, telephone bills are paid regularly because failure to do so has immediate and tangible results. Monthly payments on an automobile loan, for example, are not likely to be paid as regularly. Although an automobile may be repossessed, the process is expensive and complex. Thus, the threat of repossession is less immediate than telephone service cut-off. To encourage reliable loan re-payments, it is desirable to have a "service" cut-off for equipment subject to the loan, such as an automobile.

Conventional systems to encourage reliable loan re-payments interrupt the ignition system of an automobile on a regular, timed interval. To re-enable the automobile, a user is required to return to a payment center, make a payment, and have an agent reset the interrupt mechanism for a renewed timed interval. The system can only be reset by an authorized agent as it requires a key held in escrow at the payment center. While such a system is effective in encouraging users to repay their loans in a timely fashion, it has extreme overhead considerations. For example, the system requires a user to travel to the payment center each payment period of the loan in order to re-enable the automobile. In addition, a user must arrive at the payment center during its customer service hours. Still further, a user may have to wait to receive the attention of the first available agent at the payment center.

One solution to these problems is described in U.S. patent application Ser. No. 09/371,697, entitled "Loan Repay Enforcement System" filed on Aug. 10, 1999 and U.S. patent application Ser. No. 09/397,132, entitled "Time Based Disablement of Equipment" filed on Sep. 16, 1999, both of which are incorporated in their entirety herein by reference. These applications describe systems and methods for disabling of equipment if a payment is not timely made. Specifically, a control module associated with the equipment stores a plurality of codes. In order to prevent disablement of the equipment, a code which corresponds to one of the stored plurality of codes must be entered prior to the expiration of a payment period. In order to receive a code, timely payment must be received and logged in a payment center.

When payment for the vehicle has not been made, and in turn, a predetermined time has passed without a code being entered into the control module, the vehicle will become disabled. Further, if the vehicle is equipped with a tamper detecting device and the control module is tampered with, the vehicle will become disabled. Although a disabled vehicle prevents the delinquent payor from operating the vehicle, the lender needs to be able to retrieve the vehicle in order to attempt to recuperate the loss. To be able to recover the vehicle the lender needs to know the location of the vehicle. Accordingly, it would be desirable to provide location information regarding a disabled vehicle.

SUMMARY OF THE INVENTION

The above-identified and other deficiencies of prior methods and systems are overcome by the location system of the present invention. In accordance with the present invention, vehicle location system operates to provide a location of a vehicle if a payment due date associated with the vehicle has passed and a payment has not been received for the vehicle. The vehicle location system operates to provide the vehicle's location to a service agency. The service agency can then locate and repossess the vehicle. The service agency can be a lender or other party having a security interest in the vehicle. Alternatively, the service agency can have a contract with a party who has an interest in the vehicle to locate and repossess vehicles for which payments are delinquent. Additionally, the vehicle location system can be activated if it is detected that the vehicle is being tampered with. The location of the vehicle can be determined using global positioning satellites or by triangulation using base stations in mobile radio systems.

In accordance with one embodiment of the present invention, a vehicle disablement device installed in a vehicle determines whether a certain date has passed. If the certain date has passed the vehicle disablement device determines whether a code associated with the date has been previously entered into the vehicle disablement device. If a code associated with the date has not been previously entered then the vehicle disablement device activates a location system and provides a location of the vehicle to a service agency. The service agency can then recover the vehicle. Further, if it is detected that the vehicle disablement device has been tampered with, the vehicle disablement device, or a tamper detection device, can activate the location system and provide the location of the vehicle to the service agency. By locally activating the location system, the burden of monitoring payments for a vehicle by a service agency can be reduced. Further, the cost of the location system is reduced since the location system does not require a receiver to receive information, but instead only requires a transmitter to provide the vehicle location to the service agency.

BRIEF DESCRIPTION OF THE DRAWINGS

These and other features, aspects, and advantages of the present invention will become better understood with regard to the following description, appended claims and drawings where:

DETAILED DESCRIPTION

In accordance with each of the exemplary embodiments of the invention, there is provided apparatus for and methods of a location of vehicles. It will be appreciated that each of the embodiments described include both an apparatus and a method and that the apparatus and method of one exemplary embodiment may be different than the apparatus and method of another exemplary embodiment.

Figure 1:
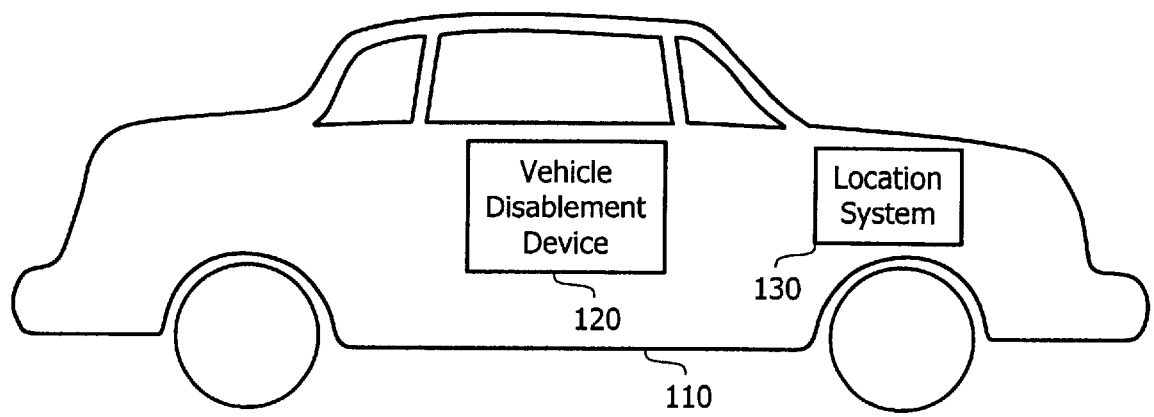
FIG. 1 illustrates a vehicle with a vehicle disablement device and a location system in accordance with exemplary embodiments of the present invention.

FIG. 1 illustrates a vehicle with a vehicle disablement device and a location system in accordance with exemplary embodiments of the present invention. As illustrated in FIG. 1, a vehicle 110 which is equipped with a vehicle disablement device 120 can also include a location system 130. In accordance with exemplary embodiments of the present invention, if it is detected that vehicle disablement device 120 has been tampered with, location system 130 will be activated to provide the location of the vehicle 110. Further, if it is determined that a payment has not been received within a predetermined amount of time, vehicle disablement device 120 will disable the vehicle 110 and activate location system 130 to provide the location of the vehicle.

In accordance with an embodiment of the present invention, the vehicle disablement device includes a keypad for receiving codes from the owner to prevent disablement of the vehicle. Specifically, the vehicle disablement device contains a plurality of codes corresponding to a plurality of dates for payments associated with the vehicle. If the payment disablement device does not receive a code from the keypad which corresponds to the stored code prior to a payment due deadline, the vehicle disablement device prevents the vehicle from operating. The vehicle disablement device prevents the vehicle from operating by disabling a critical system of the vehicle.

Figure 2:
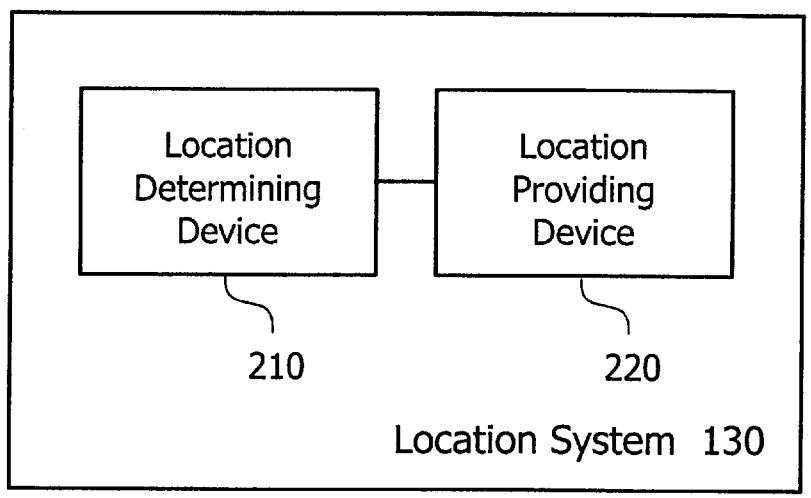
FIG. 2 illustrates the details of a location system in accordance with exemplary embodiments of the present invention.

FIG. 2 illustrates the details of a location system in accordance with exemplary embodiments of the present invention. In accordance with exemplary embodiments of the present invention, location system 130 includes a location determining device 210 and a location providing device 220. Upon activation of location system 130, location determining device 210 will be activated to determine the current location of the vehicle. In accordance with exemplary embodiments of the present invention, location determining device 210 is a global positioning satellite (GPS) receiver. Alternatively, the location of the vehicle can be determined by triangulation based upon signals from three base stations in a mobile radio communication system, or any other location determining technique.

After the location of the vehicle has been determined, location determining device 210 will provide the location providing device 220 with the current location of the vehicle. Location providing device 220 can then provide the current location of the vehicle to a service agency responsible for ensuring payments are made on the vehicle. In accordance with exemplary embodiments of the present invention, location providing device 220 can be a mobile telephone. Although the location determining device 210 and the location providing device 220 are illustrated in FIG. 2 as separate components, it should be recognized that these can designed in a single component, e.g., a GPS enabled mobile telephone.

It will be recognized that many features of conventional mobile telephones will not be required for providing the location of the vehicle. Instead the location providing device can be a device which has only the ability to access the cellular system and provide the current location of the vehicle. In other words, it is not necessary that the location providing device include a receiver and associated circuitry. Further, the location providing device need not be equipped to access voice channels of cellular systems. Instead, the location providing device can be designed to send the current location of the vehicle via short message service (SMS) commonly employed in cellular systems. Alternatively, the location providing device can access dedicated packet data channels which are now being implemented in mobile radio communication systems.

Figure 3:
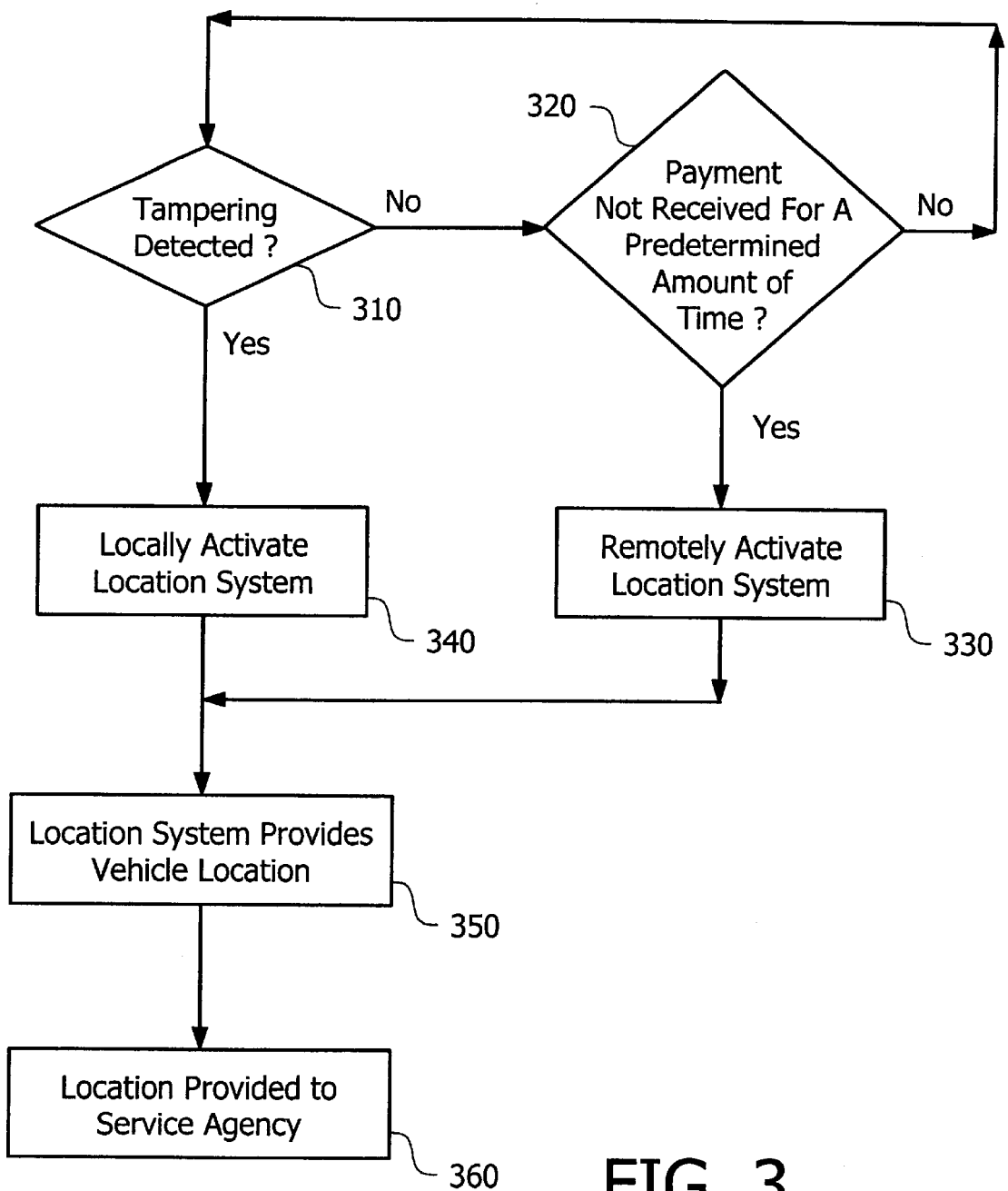
FIG. 3 illustrates a method for vehicle location in accordance with exemplary embodiments of the present invention.

FIG. 3 illustrates an exemplary method in accordance with the present invention. Initially, it is determined whether tampering with the vehicle disablement device has been detected (step 310). If tampering with the vehicle disablement device has not been detected ("NO" path out of decision step 320), it is determined whether payment has not been received for a predetermined amount of time, i.e., it is determined whether a payment due date has passed (step 320). If all payments are current ("NO" path out of decision step 320) then it is again determined whether the vehicle disablement device has been tampered with (step 310). Although step 310 has been described as determining whether tampering with the vehicle disablement device has occurred, this step can also include determining whether tampering with the vehicle location system, or any other portion of the vehicle has occurred. For example, tampering with the battery of the vehicle can activate the location system.

If it is determined that payment has not been received for a predetermined amount of time ("YES" path out of decision step 320), the location system is remotely activated (step 330). As discussed above, the location device can be implemented as a mobile telephone. Accordingly, the mobile telephone can be called from a service agency to activate the location system.

If it is determined that the vehicle disablement device has been tampered with ("YES" path out of decision step 310), the vehicle disablement device, or a tampering detecting device, will locally activate the location system (step 340).

Once the location system has been activated, either locally (step 340) or remotely (step 330), the location system provides the vehicle location to a location service (step 350). The location service can then provide the vehicle location to a service agency which is responsible for the payments made on the vehicle (step 360). It will be recognized that the vehicle location can be provide directly to the service agency, thereby eliminating step 350. Further, the location service can post the vehicle's location on a secure web page for the service agency to retrieve the vehicle location from.

One of the main advantages of the equipment disablement systems disclosed in U.S. patent application Ser. Nos. 09/371,697 and 09/397,132 is that the status of payments are monitored within a device located in the equipment to be disabled. It should be recognized that the monitoring of the status of payments by these devices is performed implicitly, since the disclosed devices are designed such that the equipment is disabled if a code is not entered by a certain date, i.e., a payment due date. The certain date used for these devices can be a date which is repeated on a daily basis, weekly basis, monthly basis, or any other type of time basis.

Figure 4:
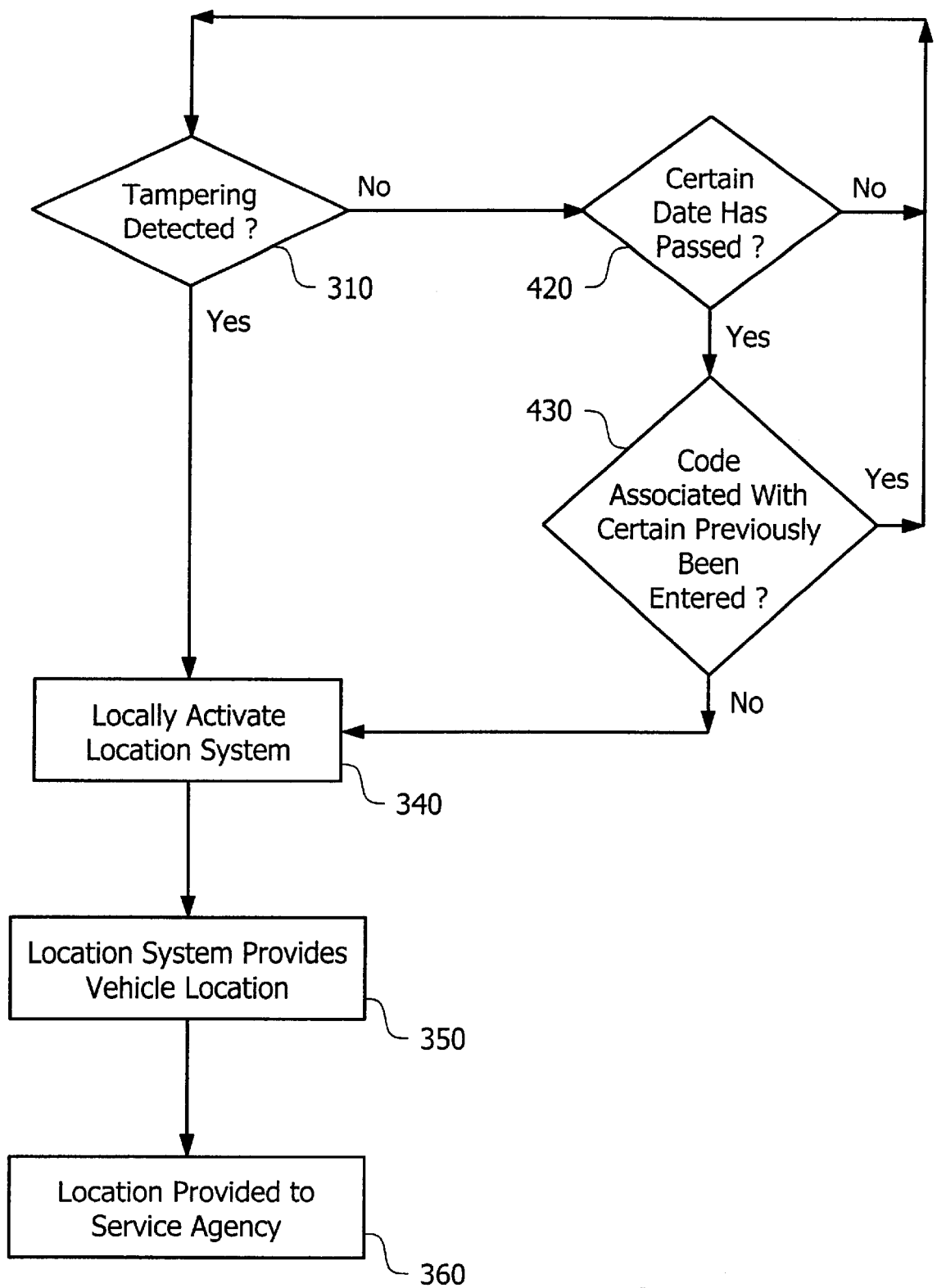
FIG. 4 illustrates a method for vehicle location in accordance with another exemplary embodiment of the present invention.

The advantages of the devices and methods disclosed in the aforementioned patent applications being self-contained can be used in connection with the present invention. FIG. 4 illustrates a method which accounts for the self-contained monitoring of the payment status. In FIG. 4, similar steps to those discussed above in connection with FIG. 3 are labeled with the same step numbers in FIG. 4, and hence, only the steps which differ between FIGS. 3 and 4 will be discussed in connection with FIG. 4. In accordance with the method of FIG. 4, steps 420 and 430 replace steps 320 and 330. Accordingly, the equipment disablement device which is located within the equipment determines whether the certain date has passed (step 420). If it is determined that the certain date has not passed ("No" path out of decision step 420), then it is determined whether tampering has been detected in accordance with the return path from step 420 to step 310. If, however, it is determined that the certain date has passed ("Yes" path out of decision step 420), then it is determined whether a code which is associated with the certain date has been input to the equipment disablement device (step 430).

If the code associated with the certain date has not been input into the equipment disablement device ("No" path out of decision step 430), then the vehicle is locally disabled by the equipment disablement device without receiving any signals outside of the vehicle and the location system is locally activated (step 340). If, however, the code associated with the certain date has been input into the equipment disablement device ("Yes" path out of decision step 430), then it is determined whether tampering has been detected in accordance with the return path from step 430 to step 310. The embodiment discussed in connection with FIG. 4 relies upon local activation, i.e., within the vehicle, of the location system. This is especially advantageous as it results in a less costly and simplified system because the system does not require a receiver to be located in the vehicle. Accordingly, the vehicle location system only requires a transmitter to relay its location. Further, the local activation reduces the amount of monitoring required by the finance company, or other party which has an interest in the vehicle, since the company knows that the vehicle disablement device will contact the finance company with the location of the vehicle if a payment has not been made or if the vehicle disablement device has been tampered with.

Although not illustrated in FIGS. 3 and 4, these methods can also include the steps of: the vehicle disablement device comparing the code received from the user with codes stored in memory; and if there is a match, storing an indication in the vehicle disablement device that the code has been entered, thereby allowing the user to operate the equipment associated with the vehicle disablement device until the date and/or time associated with a code which has not been entered has occurred. Further, the disablement device can include a plurality of lights, e.g., light emitting diodes, to indicate if the end of a payment period is upcoming. For example, a green light would indicate that no payment is due, a yellow light would indicate that a payment is due shortly, and a red light would indicate that a payment is due immediately or the equipment will be disabled. Further, the lights can blink at an increasing frequency the closer in time it is to a payment due deadline. In addition to the use of lights to indicate whether a payment is upcoming or due, an audible beep or other sound can be used to indicate such. For example, a single beep can be used to indicate that a payment is upcoming and a constant beep can indicate that a payment is passed due.

Although exemplary embodiments of the present invention have been described in connection with particular types of vehicle disablement devices, it will be recognized that the present invention is equally applicable to any type of vehicle disablement devices. Further, although exemplary embodiments of the present invention have been described in connection with a vehicle disablement device, it will be recognized that the present invention is equally applicable to any type of disablement device. Moreover, although the present invention has been described in connection with a loan, the present invention is applicable to any type of third party interest in a vehicle, including, for example, leases.

Although the present invention has been described in considerable detail with clear and concise language and with reference to certain exemplary embodiments thereof including the best mode anticipated by the inventors, other versions are possible. Therefore, the spirit and scope of the invention should not be limited by the description of the exemplary embodiments contained therein.

What is claimed is:

1. A method for locating a vehicle comprising the steps of:
   determining by a device within the vehicle whether a payment due date has passed;
   if the payment due date has passed, performing the steps of
      activating, without receiving signals from outside of the vehicle, a location determining device;
      providing the location of the vehicle from the location determining device to a location providing device; and
      sending the location of the vehicle from the location providing device to a service agency.

2. The method of claim 1, wherein the location determining device and the location providing device are a separate components within a single device.

3. The method of claim 1, wherein GPS signals are used to determine the location of the vehicle.

4. The method of claim 1, wherein a triangulation of signals from base stations associated with a mobile telephone system is used to determine the location of the vehicle.

5. The method of claim 1, further comprising the steps of:
   providing, by the service agency, the location of the vehicle on an Internet web page; and
   confiscating the vehicle using the location.

6. The method of claim 1, further comprising the steps of: illuminating a red light when a payment on the vehicle is past due.

7. A system for locating a vehicle comprising:
   a vehicle disablement system, wherein the vehicle disablement system disables the vehicle if a code associated with a payment due date is not entered prior to the payment due date;
   a location system, the location system comprising
      a location determining device, wherein the location determining device determines a location of the vehicle when the vehicle disablement system indicates that a payment due date has passed without receiving a code associated with the payment due date, and wherein the location determining device is activated without receiving signals from outside of the vehicle; and
      a location providing device, wherein the location providing device receives the location of the vehicle from the location determining device and provides the location of the vehicle to a service agency.

8. The system of claim 7, wherein the location providing device and the location determining device are comprised in a mobile radio telephone, a global positioning system (GPS) module in the mobile radio telephone determines the vehicle position and the mobile radio telephone provides the location of the vehicle to the service agency over an air interface to a base station associated with a radio communication system.

9. The system of claim 7, wherein the location providing device comprises only a transmitter portion of a mobile radio telephone.

10. The system of claim 7, wherein the service agency has an interest in the vehicle.

11. The system of claim 7, wherein the service agency has a contract with a party who has an interest in the vehicle for determining the location of the vehicle when the payment due date has passed without the vehicle disablement device receiving a code associated with the payment due date.

12. The system of claim 7, further comprising: a red and green light to indicate whether a payment is due.

13. The system of claim 7, further comprising:
a tampering detector, wherein if the tampering detector determines that the vehicle disablement device or the location system has been tampered with, the tampering detector activates the location system to provide the location of the vehicle to the service agency.

14. A system for locating a vehicle comprising:
a location determining device, wherein the location determining device determines a location of the vehicle when a payment due date has passed without a payment having been made, wherein the determination of whether a payment due date has passed without a payment having been made is determined within the vehicle; and a location providing device, wherein the location providing device receives the location of the vehicle from the location determining device and provides the location of the vehicle to a service agency.

15. The system of claim 14, wherein the location providing device and the location determining device are comprised in a mobile radio telephone, a global positioning satellite (GPS) module in the mobile radio telephone determines the vehicle position and the mobile radio telephone provides the location of the vehicle to the service agency over an air interface to a base station associated with a radio communication system.

16. The system of claim 14, wherein the service agency has an interest in the vehicle.

17. The system of claim 14, wherein the service agency has a contract with a party who has an interest in the vehicle for determining the location of the vehicle when the payment due date has passed without the vehicle disablement device receiving a code associated with the payment due date.

18. The system of claim 14, further comprising:
a red, yellow and green light and an audible sound to indicate whether a payment is due.

19. The system of claim 14, further comprising:
a tampering detector, wherein if the tampering detector determines that the location system has been tampered with, the tampering detector activates the location system to provide the location of the vehicle to the service agency.

20. A method for providing a location of a vehicle comprising the steps of:
activating, without receiving signals from outside of the vehicle, a location determining device if a payment due date associated with the vehicle has passed without a payment associated with the payment due date having been received for the vehicle, wherein the determination is made within the vehicle;

providing the location of the vehicle from a location determining device to a location providing device; and sending the location of the vehicle from the location providing device to a service agency.

21. The method of claim 20, wherein GPS signals are used to determine the location of the vehicle.

22. The method of claim 20, wherein a triangulation of signals from base stations associated with a mobile telephone system is used to determine the location of the vehicle.

23. The method of claim 20, further comprising the steps of:
illuminating a yellow light and producing an audible sound when a payment on the vehicle is coming due; and illuminating a red light and producing a constant audible sound when a payment on the vehicle is past due.

* * * * *